United States Patent [19]

Képpler et al.

[11] 4,036,794
[45] July 19, 1977

[54] MANUFACTURE OF EXPANDABLE STYRENE POLYMERS

[75] Inventors: Hans Georg Képpler, Weinheim; Erhard Stahnecker, Heidelberg; Rolf Moeller, Ludwigshafen, all of Germany

[73] Assignee: BASF Aktiengesellschaft, Ludwigshafen am Rhine, Germany

[21] Appl. No.: 730,826

[22] Filed: Oct. 8, 1976

[30] Foreign Application Priority Data

Oct. 30, 1975  Germany .............................. 2548524

[51] Int. Cl. .................................................. C08J 9/20
[52] U.S. Cl. ............................ 260/2.5 B; 260/2.5 HB; 260/886; 526/201; 526/346

[58] Field of Search ...................... 260/2.5 B, 2.5 HB; 526/201

[56] References Cited

U.S. PATENT DOCUMENTS 2,888,410  5/1959  Buchholz ......................... 260/2.5 B

*Primary Examiner*—Morton Foelak
*Attorney, Agent, or Firm*—Keil, Thompson & Shurtleff

[57] ABSTRACT

A process for the manufacture of expandable styrene polymers by suspension polymerization of the monomers in the presence of blowing agents and suspension stabilizers, the latter having been manufactured by polymerization of vinyl monomers in the presence of vinylpyrrolidone polymers. The expandable styrene polymers can be further processed to give foams.

9 Claims, No Drawings

MANUFACTURE OF EXPANDABLE STYRENE POLYMERS

Bead polymers of styrene or other monomeric polymerizable compounds are conventionally manufactured by suspension polymerization in an aqueous phase. It is necessary to use not only suitable initiators but also suspension stabilizers, to prevent coalescence of the polymerizing monomer droplets. Suspension stabilizers preferentially used industrially are organic macromolecular compounds, namely protective colloids. Examples of these are vinylpyrrolidone polymers, e.g. polyvinylpyrrolidone and copolymers of vinylpyrrolidone with acrylic acid or methacrylic acid and their esters or amides, or with vinyl esters, hydrolysis products of polyvinyl acetate, namely polyvinylalcohols, and cellulose ethers. British Pat. No. 816,579 discloses graft polymers of monomers and polyvinyl alcohol, polyacrylic acid or polyacrylamide, for use as suspension stabilizers. However, the stabilizing action, and reproducibility, of these is far inferior to that of the above water-soluble protective colloids.

The styrene bead polymers manufactured using these suspension stabilizers of the prior art as a rule have a relatively high internal water content, which has an adverse effect on the properties, and further processing, of the products.

It is an object of the present invention to develop a process which permits the manufacture of styrene bead polymers of lower internal water content. This is particularly desirable, for example, for the manufacture of expandable styrene polymers, in order to achieve a uniform foam structure.

We have found that this object is achieved, according to the invention, by using, in the manufacture of expandable polystyrene particles by suspension polymerization of styrene, with or without other monomers, in the presence of blowing agents and suspension stabilizers, a stabilizer which is manufactured by free radical polymerization, in an aqueous phase, of from 90 to 10, preferably of from 70 to 15, and especially advantageously from 50 to 25, parts by weight of styrene, substituted styrenes, esters of acrylic acid or methacrylic acid with alcohols of 1 to 8 carbon atoms, nitriles or amides of acrylic acid or methacrylic acid, vinyl esters of saturated monocarboxylic acids of 2 to 12 carbon atoms, vinyl chloride, butadiene or their mixtures in the presence of from 10 to 90, preferably from 30 to 85 and particularly advantageously from 50 to 75 parts by weight of polyvinylpyrrolidone or of a copolymer of vinylpyrrolidone in which polymerized units of the latter predominate.

These reactions can be carried out in the presence or absence of minor amounts, preferably from 0.1 to 2 per cent by weight, based on the monomers, of crosslinking comonomers, e.g. divinylbenzene or butanediol diacrylate. The polymers can also be manufactured in the presence of regulators and of surface-active compounds. Amongst the possible monomers, n-butyl acrylate, tert.-butyl acrylate and styrene have proved particularly advantageous.

The suspension stabilizers claimed according to the invention can be manufactured by a one-vessel process, in which the entire charge is contained in one reaction vessel. However, the stabilizers can also be manufactured by a process wherein the reaction mixture is run into the vessel continuously.

The process is distinguished by a wide range of possible embodiments. Thus, it is also possible to add various monomers or monomer mixtures stepwise so as to obtain products of heterogeneous structure in respect of the monomeric reactants present as polymerized units. The softening point of the polymers formed can be varied virtually as desired, by choice of the combination of monomers.

The suspension stabilizers to be used according to the invention are added to the reaction mixture in amounts of from 0.1 to 0.7% by weight, based on the amount of monomer, either at the start of the polymerization or, particularly advantageously, during the polymerization, when the conversion is from 5 to 40%. The stabilizers are advantageously handled as an aqueous solution of from 5 to 20% strength by weight, which can readily be metered out.

By using the suspension stabilizers manufactured according to the invention, it is possible to manufacture expandable polystyrenes which have an internal water content which as a rule is 0.5% or less, depending on the bead size.

The process claimed in of particular importance if non-utilizable fractions of bead polystyrene containing blowing agent and having a particle size of from 0.4 to 0.9 mm, which has been manufactured by suspension polymerization using an organic protective colloid, are added to the monomer phase, since the internal water contents of the resulting bead polymers are very low in spite of the presence of this polystyrene constituent.

In contrast, the internal water contents found when pure polyvinylpyrrolidone is used as the suspension stabilizer are in most cases in excess of 1%, especially if redissolved material is present. In that case, the internal water contents rise with increasing amount of redissolved material, and this is undesirable. If these internal water contents are compared with those found when following the process of the invention, the difference found, in absolute terms, is from 0.8 to 2%. The disadvantages of an increased internal water content are evident, since the drying process is involved and expensive and there is a danger that prolonged drying may damage the foam structure.

From the point of view of providing a reliable and reproducible process and making it possible to vary the mean bead diameter of the styrene bead polymers virtually as desired, the suspension stabilizers of the invention are at least as suitable as polyvinylpyrrolidone. They have an excellent stabilizing action. Against this, the suspension stabilizers manufactured according to British Pat. No. 816,579 have a substantially reduced stabilizing action, even as compared to their watersoluble components. This manifests itself in an increased tendency for coagulation to occur during the bead polymerization, and in the formation of coarse lentil-shaped beads containing cavities.

The process according to the invention relates to the manufacture of bead polymers of styrene by suspension polymerization of styrene or of monomer mixtures which contain at least 50% by weight of styrene, a blowing agent being added during or after the polymerization. In addition to styrene and styrene derivatives, further monomers which may be present are acrylonitrile, esters of acrylic acid or methacrylic acid with alcohols of 1 to 8 carbon atoms, N-vinyl compounds such as vinylcarbazole, or small amounts of compounds which contain two double bonds, such as butadiene, divinylbenzene or butanediol diacrylate. The styrene derivatives include, for example, α-methylstyrene or ring-substituted styrenes, such as p-chlorostyrene.

To obtain expandable polymer beads, blowing agent is metered in by conventional methods before, during or after the suspension polymerization. Suitable blowing agents are hydrocarbons which are gaseous or liquid under normal conditions, do not dissolve the styrene polymer and have boiling points below the softening point of the polymer. Examples of suitable blowing agents or blowing agent mixtures are propane, butane, pentane, cyclopentane, hexane, cyclohexane and halohydrocarbons, e.g. methyl chloride, dichlorodifluoromethane or trifluorochloromethane.

The polymerization is started with organic polymerization initiators which decompose under the influence of heat to give free radicals which initiate the polymerization. Examples of conventionally used initiators are peroxides, e.g. benzoyl peroxide, lauroyl peroxide, t-butyl perbenzoate, t-butyl peroctoate and t-butyl perpivalate, or unstable azo compounds, e.g. azodiisobutyronitrile.

The nature of the peroxide to be used depends on the envisaged polymerization temperature. It is particularly advantageous to use mixtures of initiators, and the polymerization temperatures can be matched to the respective half-lives of the initiators. As a rule, the polymerization temperature is from 60° to 150° C, preferably from 80° to 120° C.

The processing characteristics of expandable polystyrene beads are greatly dependent on the cell structure formed. The cell structure, which may be characterized, for example, by specifying the number of cells per mm, may be controlled by using cell regulators. To produce flameproof styrene polymers it is necessary to employ flameproofing agents which in many cases are added to the bead polymerization reaction mixture rather than subsequently. Suitable flameproofing agents are, in particular, organic halogen compounds, especially brominated organic compounds. Examples are hexabromocyclododecane or tris(dibromopropyl) phosphate.

Further components which may be present in the polymerization batch are organic or inorganic fillers, antistatic agents and plasticizers.

In the following Examples parts, ratios and percentages are by weight.

EXAMPLES

A. Manufacture of the protective colloids

EXAMPLES A1 - A7

100 parts of a 20% strength aqueous polyvinylpyrrolidone solution+, followed by 0.2 part of sodium pyrophosphate, are introduced into a stirred flask which can be heated. One of the monomers shown in the Table below, 0.4% of azodiisobutyronitrile, to act as the initiator, being dissolved in the monomer, and a four-fold amount, relative to monomer, of fully deionized water, are then added. The reaction mixture is heated to 80°C and left for 6 hours at this temperature, with constant stirring. It is then cooled to room temperature. The reaction product has a solids content of about 20%. It is used as a protective colloid after dilution to 10%. The Table below shows the amount and type of the monomers reacted.

| Example | A 1 | A 2 | A 3 | A 4 | A 5 | A 6 | A 7 |
|---------|-----|-----|-----|-----|-----|-----|-----|
| Parts | 2.22 | 6.66 | 20 | 2.22 | 6.66 | 6.66 | 20 |

-continued

| Example | A 1 | A 2 | A 3 | A 4 | A 5 | A 6 | A 7 |
|---------|-----|-----|-----|-----|-----|-----|-----|
| Monomer | styrene | styrene | styrene | acrylonitrile | n-butyl acrylate | t-butyl acrylate | t-butyl acrylate |
| Ratio of polyvinylpyrrolidone : monomer | 9:1 | 3:1 | 1:1 | 9:1 | 3:1 | 3:1 | 1:1 |

The K-value of the polyvinylpyrrolidone solution is 90 (determined by the method of Fikentscher, Cellulosechemie 13 (1932), 58).

B. Method of bead polymerization used in Examples B1-B9

EXAMPLES B1 - B7

A mixture of 100 parts of water, 0.1 part of sodium pyrophosphate, 90 parts of styrene, 10 parts of material intended to be redissolved (a bead polystyrene (K-value 60), containing blowing agent, which has a particle size of from 0.4 to 0.9 mm and has been manufactured by suspension polymerization, using an organic suspension stabilizer), 0.155 part of dibenzoyl peroxide, 0.266 part of t-butyl perbenzoate and 0.040 part of 1,2,5,6,9,10-hexabromocyclododecane are introduced into a pressure-resistant stirred vessel equipped with a stirrer unit.

The mixture is polymerized in the closed kettle, whilst stirring, for 4 hours at 90° C, 2 hours at 105° C and then 3 hours at 120° C. 3.5 parts of one of the 10% strength protective colloids manufactured according to Examples A1 to A7 are added, as the suspension stabilizer, after about 130 minutes, so as to give a means bead size of from 1.2 to 1.6 mm. 3 hours after reaching 90° C, 7 parts of a mixture of 25% of isopentane and 75% of n-pentane are added in the course of 10 - 15 minutes.

After the bead polymerization has ended, the polymer beads are substantially isolated by centrifuging off the external water. In order to determine the internal water content, the following method is used: a sample is treated with methanol for 2 minutes to remove the external water and is then drained on a suction filter and blown dry by a current of air at 20° C for 5 minutes. The internal water content is determined by the Karl Fischer method, and is measured separately for the fraction of from 1.0 to 1.25 mm and the fraction of from 1.25 to 2.0 mm.

EXAMPLES B8 and B9

The bead polymerization is carried out by the method described for Examples B1 - B7. However, no redissolved material is used. The amount of styrene is 100 parts.

| Bead polymerization Example | Type of suspension stabilizer | Water content, % | |
|---|---|---|---|
| | | 1.0 - 1.25 ml | 1.25 - 2.0 mm |
| B1 | A1 | 0.45 | 0.81 |
| B2 | A2 | 0.39 | 0.72 |
| B3 | A3 | 0.40 | 0.66 |
| B4 | A4 | 0.48 | 0.90 |
| B5 | A5 | 0.46 | 0.54 |
| B6 | A6 | 0.34 | 0.48 |
| B7 | A7 | 0.27 | 0.39 |
| B8 | A5 | 0.35 | 0.49 |
| B9 | A7 | 0.22 | 0.34 |

Method of bead polymerization used in Example B10

The bead polymerization is carried out in accordance with the instructions which have been described. However, the composition of the reaction mixture is 100 parts of water, 0.1 part of sodium pyrophosphate, 88 parts of styrene, 2 parts of acrylonitrile, 10 parts of material to be redissolved (as described in Examples B1 - B7), 0.15 part of dibenzoyl peroxide, 0.30 part of t-butyl perbenzoate, 0.30 part of dicumyl peroxide and 0.95 part of 1,2,5,6,9,10-hexabromocyclododecane.

The mixture is polymerized for 6 hours at 80° C, and 8 hours at 115° C, whilst stirring. 3.5 parts of 10% strength protective colloid from Example A6 are added, after about 120 minutes, as the suspension stabilizer. The product is worked up, and the water determined, by the method described for Examples B1 - B7.

The internal water content was 0.52% for the bead fraction of from 1.0 to 1.25 mm and 0.68% by weight for the fraction of from 1.25 to 2.0 mm.

EXAMPLE B11

The procedure followed was as described in Example 10, but no material to be redissolved was used. The monomer mixture consists of 98.0 parts of styrene and 2.0 parts of acrylonitrile. The internal water content was 0.39% for the bead fraction of from 1.0 to 1.25 mm and 0.50% for the bead fraction of from 1.25 to 2.0 mm.

C. COMPARATIVE EXPERIMENTS (C1 - C4)

For the Comparative Experiments, bead polymerizations were carried out by the method which has been described. However, 3.5 parts of a 10% strength aqueous solution of polyvinylpyrrolidone of K value 90, as determined by the method of Fikentscher, Cellulosechemie 13 (1932), 58, were used as the suspension stabilizer.

| Comparative Experiment | for Example | Internal water content 1.0 – 1.25 mm | 1.25 – 2.0 mm |
|---|---|---|---|
| C1 | B1 – B7 | 1.33 | 1.95 |
| C2 | B8, B9 | 1.05 | 1.46 |
| C3 | B10 | 1.89 | 2.71 |
| C4 | B11 | 1.38 | 2.11 |

D. COMPARATIVE EXPERIMENTS ACCORDING TO BRITISH PAT. NO. 816,579

The experiments were carried out by the method described in Examples B1 - B9. However, instead of the suspension stabilizers according to the invention, suspension stabilizers manufactured according to the above British Patent were used in Experiments D1 to D3. Experiments D4 to D6 were carried out in accordance with the invention.

| Bead polymerization Example | Type of protective colloid | Content of beads larger than 2.5 mm, % | Notes |
|---|---|---|---|
| D1 | Polyvinyl alcohol/ styrene, 3:1 | 63.5 | coarse lentil-shaped particles |
| D2 | Polyvinyl alcohol/ styrene, 1:1 | 78.0 | lentil-shaped particles with cavities |
| D3 | Polyacrylic acid/ styrene, 1:1 | — | the batch coagulated completely |
| D4 | Polyvinylpyrrolidone/ styrene, 3:1 | 0 | round beads |
| D5 | Polyvinylpyrrolidone/ styrene, 1:1 | 1.0 | round beads |
| D6 | Polyvinylpyrrolidone/ t-butyl acrylate, 1:1 | 0.5 | round beads |

The Comparative Experiments show that using the suspension stabilizers described in British Pat. No. 816,579, coarse lentilshaped particles are obtained, whilst the suspension stabilizers of the invention give the desired round beads. The Comparative Experiments further show that when using the suspension stabilizers of British Pat. No. 816,579, disproportionately high percentages of coarse particles are formed. These percentages are extremely low in the case of the process of the invention.

We claim:

1. In a process for the manufacture of expandable polystyrene particles by suspension polymerization of styrene, with or without a minor amount of one or more other monomers, in the presence of a blowing agent and a suspension stabilizer, the blowing agent being added during or after the polymerization, wherein the suspension polymerization is carried out in the presence of a suspension stabilizer, the improvement wherein the suspension stabilizer has been manufactured by free radical polymerization, in the aqueous phase, of from 90 to 10 parts by weight of styrene, a substituted styrene, an ester of acrylic acid or methacrylic acid with an alcohol of 1 to 8 carbon atoms, a vinyl ester of a saturated monocarboxylic acid of 2 to 12 carbon atoms, a nitrile or amide of acrylic acid or methacrylic acid, vinyl chloride, butadiene or a mixture of two or more thereof, in the presence of from 10 to 90 parts by weight of polyvinylpyrrolidone or of a copolymer of vinylpyrrolidone in which polymerized units of the latter predominate.

2. A process as claimed in claim 1, wherein the suspension stabilizer is manufactured with the aid of azoisobutyronitrile as initiator for the free radical polymerization.

3. A process as claimed in claim 1, wherein the suspension stabilizer is manufactured by free radical polymerization of tert.-butyl acrylate.

4. A process as claimed in claim 1, wherein the suspension stabilizer is manufactured by free radical polymerization of n-butyl acrylate.

5. A process as claimed in claim 1, wherein the suspension stabilizer is manufactured by free radical polymerization of styrene.

6. A process as claimed in claim 1, wherein the suspension stabilizer is manufactured in the presence of a crosslinking comonomer.

7. A process as claimed in claim 1, wherein the suspension stabilizer is manufactured by free radical polymerization in the presence of a surface-active compound.

8. A process as claimed in claim 1, wherein the suspension stabilizer is manufactured in the presence of from 50 to 75 parts by weight of polyvinylpyrrolidone or the vinyl pyrrolidone copolymer, from 25 to 50 parts by weight of monomer being polymerized.

9. A process as claimed in claim 1, wherein from 0.1 to 0.7 per cent by weight, based on monomer(s), of suspension stabilizer is used.

* * * * *